United States Patent [19]

Grihangne

[11] 3,987,866
[45] Oct. 26, 1976

[54] GROUND-REACTION MACHINES

[76] Inventor: André Grihangne, 186, Avenue Victor Hugo, Paris (16°), France

[22] Filed: June 4, 1974

[21] Appl. No.: 476,326

Related U.S. Application Data

[63] Continuation of Ser. No. 241,029, April 4, 1972, abandoned.

[30] Foreign Application Priority Data

Apr. 9, 1971  France .............................. 69.12639

[52] U.S. Cl. .............................................. 180/128
[51] Int. Cl.² ............................................. B60V 1/16
[58] Field of Search ........... 180/121, 126, 127, 128, 180/117, 118

[56] References Cited
UNITED STATES PATENTS

| | | | |
|---|---|---|---|
| 3,106,260 | 10/1963 | Bollum, Sr. .......................... | 180/121 |
| 3,183,988 | 5/1965 | Jones ................................... | 180/121 |
| 3,239,023 | 3/1966 | Jones ................................... | 180/121 |
| 3,268,021 | 8/1966 | Jones et al. ......................... | 180/128 |
| 3,306,388 | 2/1967 | Jones ................................... | 180/128 |
| 3,362,499 | 1/1968 | Tripp ................................... | 180/128 |
| 3,677,361 | 7/1972 | Bertin ................................. | 180/121 |
| 3,713,507 | 1/1973 | Bertin ................................. | 180/127 |
| 3,888,330 | 6/1975 | Eggington ........................... | 180/117 |

*Primary Examiner*—M. H. Wood, Jr.
*Assistant Examiner*—Jack D. Rubenstein
*Attorney, Agent, or Firm*—Stevens, Davis, Miller & Mosher

[57] ABSTRACT

This invention relates to ground-reaction machines, such as hovercraft, and is particularly concerned with flexible enclosure arrangements, often referred to as skirts, for enclosing a fluid cushion beneath the loading platform of the machine. According to the invention, air fed into the arrangement to form the cushion, is channelled or directed by cells having walls which are linked in series along the periphery of the platform. This ensures the feed and enclosure of a single undivided central cushion at a pressure which is substantially uniform and of which the boundaries represent an auxiliary structure. In a preferred construction, each of the cells is bounded by two flexible walls, all the horizontal sections of which are of bi-convex, lenticular shape.

6 Claims, 12 Drawing Figures

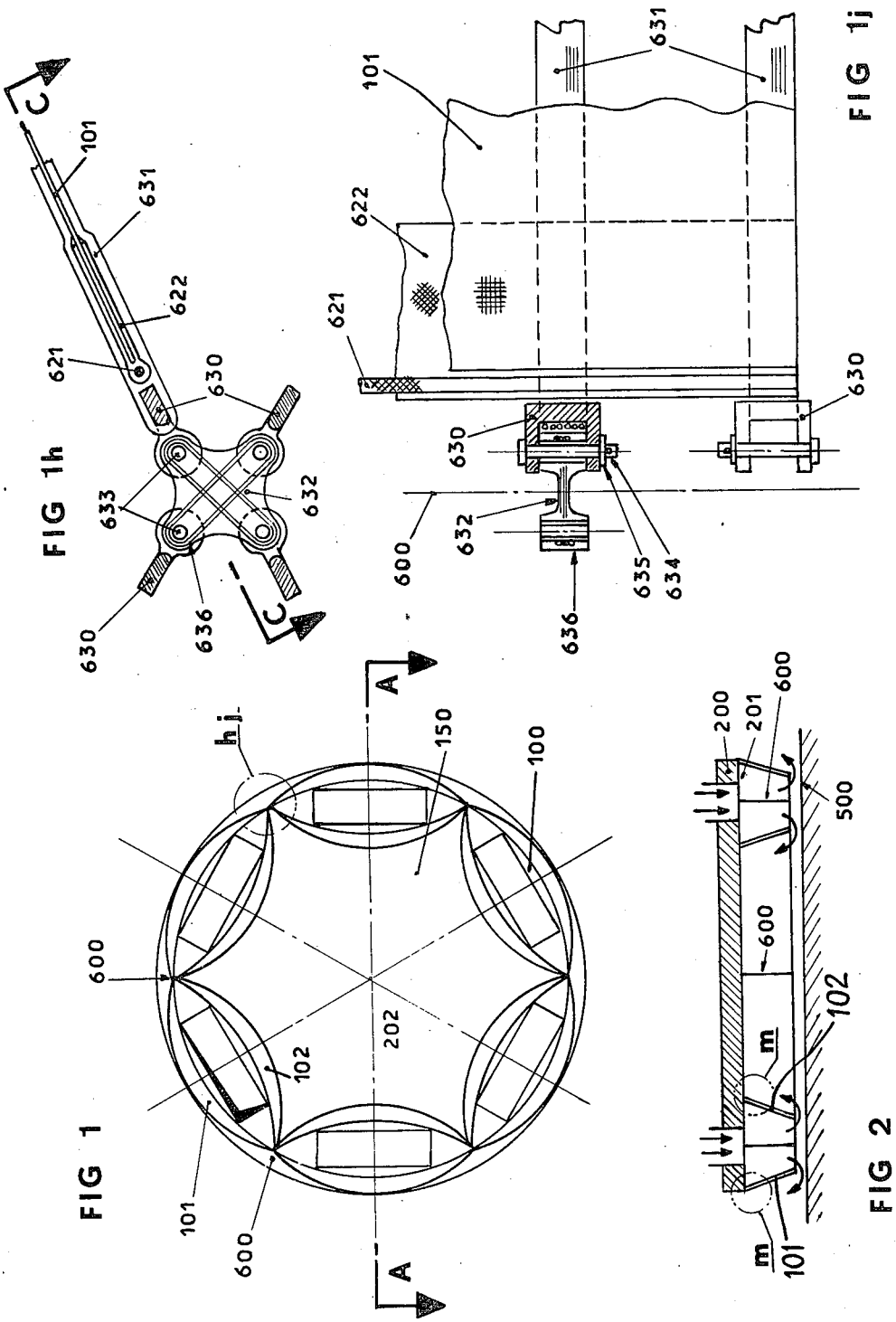

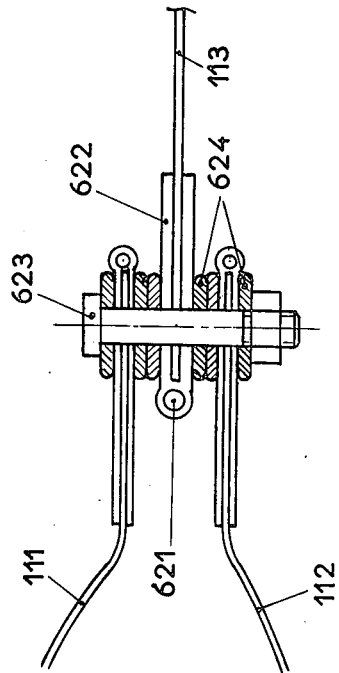
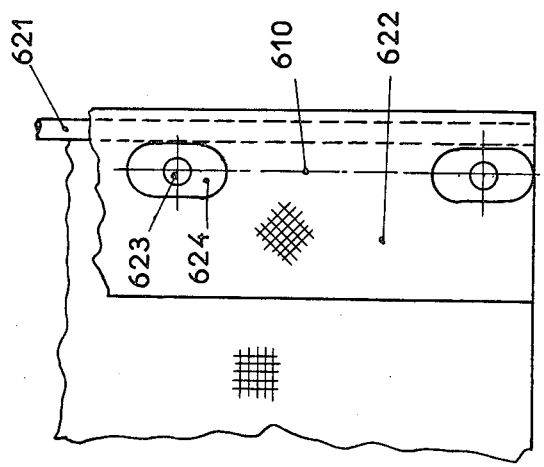
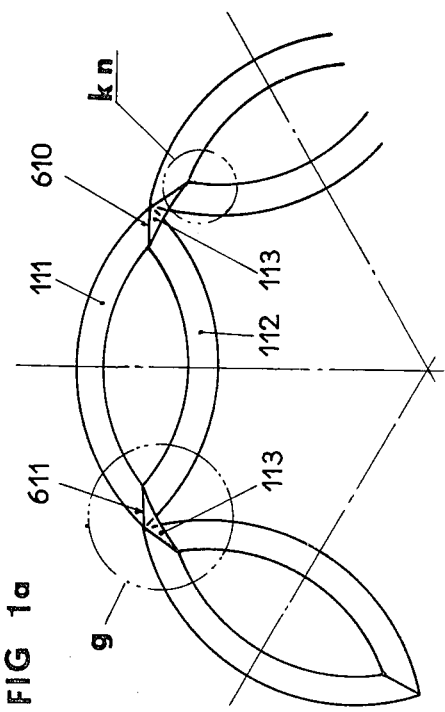
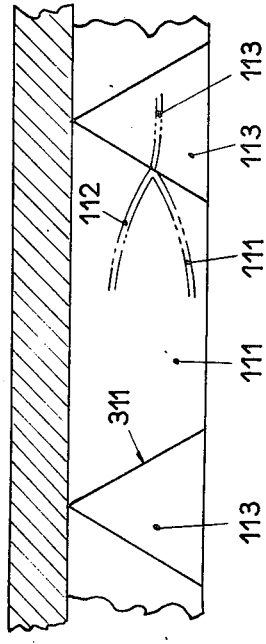

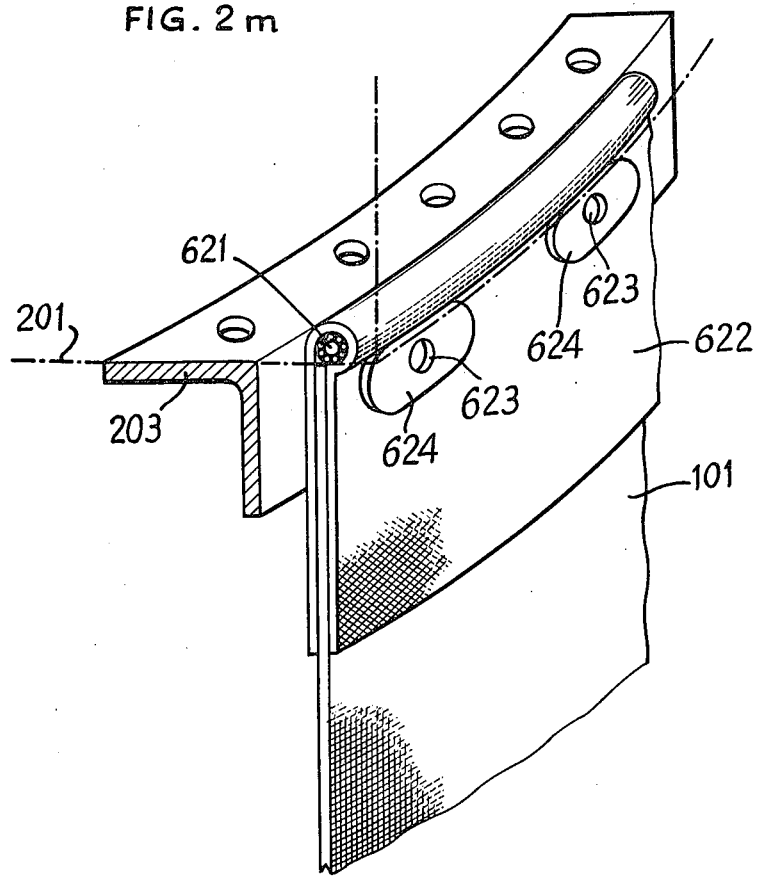

GROUND-REACTION MACHINES

This is a continuation of application Ser. No. 241,029, filed Apr. 4, 1972, now abandoned.

The present invention relates generally to ground-reaction machines, such as hovercraft, and more especially to amphibious vehicles which are supported by at least one pressurised air cushion, each cushion being bounded by flexible skirts interposed between the structure of the machine and the surface (ground or water) over which the machine moves.

In a very general fashion, the present invention offers a number of original technical solutions to the definition of support devices such as advantageously to modify the design and construction of ground-reaction machines of all sizes. These solutions have been adopted as the most satisfactory from the point of view of economy as regards both construction, use, performance and safety. Certain of these devices offer a solution to technical problems tackled for the first time and they are therefore neither derived from nor dependent upon past techniques.

The present invention relates more especially to arrangements of flexible walls laterally enclosing the cushion or cushions of air or other fluids supporting a ground-reaction machine of whatever size.

In contemporary air-cushion craft equipped with flexible skirt devices trimming is known to present a very serious problem. The permitted limits of trim, notably about the longitudinal axis, allow the centre of gravity of the load to vary only within narrow limits and for some craft the normal operational possibilities are thus curtailed or even nullified. The permitted limits of trim depend closely on the layout of the arrangement in relation to the platform and to the method used to supply the arrangement with fluid under pressure. At the present time, multi-skirt machines with high pneumatic stiffness in pitch and roll, conferring maximum stability to the platform, give rise to unpleasant vertical accelerations; machines with low pneumatic stiffness in pitch and roll require the added effect of hydrodynamic restorative forces on the platform to re-establish a minimum stability thereof and at the cost of a perceptible increase in drag.

In accordance with the present invention, two flexible walls, suitably linked, are fixed to the periphery of the platform in the form of cells, which channel the fluid under pressure in such a way that the pneumatic stiffness in pitch and roll are satisfactory for small differences in pressure between, on the one hand, the cushions that are laterally enclosed and, on the other hand, the space enclosed between the flexible walls of the arrangement, allowing vertical accelerations to be limited in an advantageous manner. In addition, the distribution of the supply of fluid under pressure along the periphery allows adjustable controls to be installed, particularly to effect the easy displacement of the point of impingement of the resulting aerostatic forces on the platform in a direction selected by the operator of the machine or vehicle. The considerable mechanical advantage provided by the forces thus adjusted at the periphery and particularly at the front and rear of the platform, allow the limits of trim to be enlarged to a considerable additional extent.

In addition, whereas contemporary multi-skirt arrangements subject the fluid fed to the cushions to at least two areas of restricted flow as it crosses the skirts before being ejected, the arrangement adopted in the invention imposes only one area of restricted flow at the bottom of a skirt and thus makes possible, all other things being equal, a significant economy in the power used for the support of the machine.

The arrangement according to the invention best preserves the uniformity of the pressure field over the largest possible area of the cushion which it encloses and thus leads to a considerable reduction in the wave-drag caused by the movement of the vehicle above the water, particularly at hump-speed, and to a considerable reduction in spray-drag by comparison with conventional multi-skirt or divided cushions.

Moreover, scooping phenomena observed with the peripheral skirts of contemporary multi-skirt cushions are minimised or even substantially eliminated by the arrangement according to the invention.

In order that the invention may be better understood, reference will now be made to the accompanying drawings showing embodiments thereof by way of example, and in which:

FIG. 1 shows a general view, from below, of an enclosure arrangement of the invention, linked, in the example chosen, to the hull of an air-cushion vehicle of generally circular shape, FIG. 2 shows a vertical section along the line AA of FIG. 1, FIG. 1a shows a partial schematic view relating to FIG. 1, and shows a possible variation in the joining of the cells making up the enclosing arrangement, FIG. 1g shows an elevational view of detail g of FIG. 1a, FIG. 3 shows a general view, from below, of the enclosure arrangement of the invention, linked, in the new example chosen, to the hull of an air-cushion vehicle of general oblong shape, FIG. 4 shows a vertical sectional view along the line BB of FIG. 3, FIG. 3a shows a partial schematic perspective view relating to FIGS. 3 and 4 showing in particular the geometrical layout of the walls enclosing the cells which comprise the enclosing arrangement for the hull of the air-cushion vehicle of oblong shape, FIGS. 1h and 1j show two views of detail hj of FIG. 1 in horizontal section and in section along the line CC respectively, showing one of the junctions of the four walls of the enclosing arrangement in the first example chosen, FIGS. 1k and 1n show two views of detail kn of FIG. 1a, in horizontal section and in elevation respectively, of one of the junctions of the three walls of the enclosing arrangement in variation 1a of the first example chosen, and FIG. 2m shows a partial schematic perspective view of the details m of FIG. 2 which represents the method of fixing the walls of the enclosing arrangement to the platform of the air-cushion vehicle.

Referring now to the drawings, FIGS. 1 and 2 show an arrangement according to the invention, which brings about the lateral enclosure of the cushion and the supply of its infed medium by a series of identical cells 100 of which the flexible walls 101 and 102 are attached by their upper portion to the hull 200 which in the example chosen has a generally circular shape.

Each of the cells 100 is bounded, between two parallel planes 500 and 201 of the ground and the platform, by two, approximately conical, oblique, converging, flexible walls 101 and 102, intersecting at the junction lines 600 described below in such a way that any section taken parallel to the base 201 of the platform has a biconvex lenticular form. The section of the feed efflux, situated at the bottom of the cell, is smaller than that situated at the level of attachment to the platform, giving it a stable geometry when pressurised. The enclosing arrangement is the result of assembling cells 100 end to end in such a way that the geometric centre 202 of the platform is situated at the meeting point of the centre lines of the arcs forming the boundaries of the conical surfaces, each of the cells occupying a sector of the perimeter of the said platform. In this way, the walls of the cells 100 are united along their common generating line 600 and define a chamber 150 that is laterally fully enclosed.

In the modification shown in FIGS. 1a and 1g each basic cell is defined under the same conditions as above by two straight, converging, flexible, conical walls 111 and 112, intersecting along lines of junction 610 and 611. In this case, all horizontal cross-sections are similar. The end to end assembly of the cells is achieved with the aid of simple flexible gusset walls 113 of conical form and of curved triangular outline.

In FIGS. 3, 3a and 4 is represented an arrangement which ensures the lateral enclosure of the cushion and the distribution of its feed by a series of cells 300 and 310 of two types of which the flexible walls 301, 302, 311 and 312 are fixed by their upper part to the hull 250 which, in the example chosen, has a generally oblong shape.

Each of the cells 300 and 310 is bounded, under the same conditions as above, by two flexible walls 301 and 302 or 311 and 312 presenting a regular or irregular surface in such a way that the horizontal section through the base 303 has a bi-convex lenticular shape, smaller in area than the area of section 304 where it is joined to the platform. The end to end assembly of the cells occurs in the area of the junction lines 605 and 606 or 607 and 608, which are themselves linked together by a flexible, triangular, plane wall 305 or 306 stretching either, in a normal case, along the longitudinal axis of the platform in the case of the straight lateral parts of the device, or radially in the case of the circular portions at the end of the platform 250.

In FIGS. 1h, 1j, 1k, 1n, 2m, are shown, as nonlimiting examples, certain methods of effecting the junction of the cell walls constituting the arrangement of the invention, as well as the method of fixing the said walls to the platform of an air-cushion vehicle.

Walls 101, 102, 111, 112, 301, 302, 311, 312, 305 are produced as panels of coated, woven material with the warp running horizontally, which are fitted along their edge with a flexible, stretch-resistant cable 621 held in place by a strip of material 622 which caps the edge of the material and whose weave is oblong. These elements are held together by adhesion and sewing or by vulcanisation.

FIG. 2m shows schematically the fixing of the panels making up the walls to the lower face 201 of the platform 200. The panels are clamped to an angle member 203 by a number of bolts 623 via oblong clamping washers 624 bearing against an edging cable 621. The washers can with advantage be vulcanised onto the walls.

FIG. 1k shows schematically in the same way the linkage between three walls.

FIGS. 1h and 1j show the method of linking the walls of adjoining cells, referring to the layout in FIGS. 1 and 2.

Figure 3:
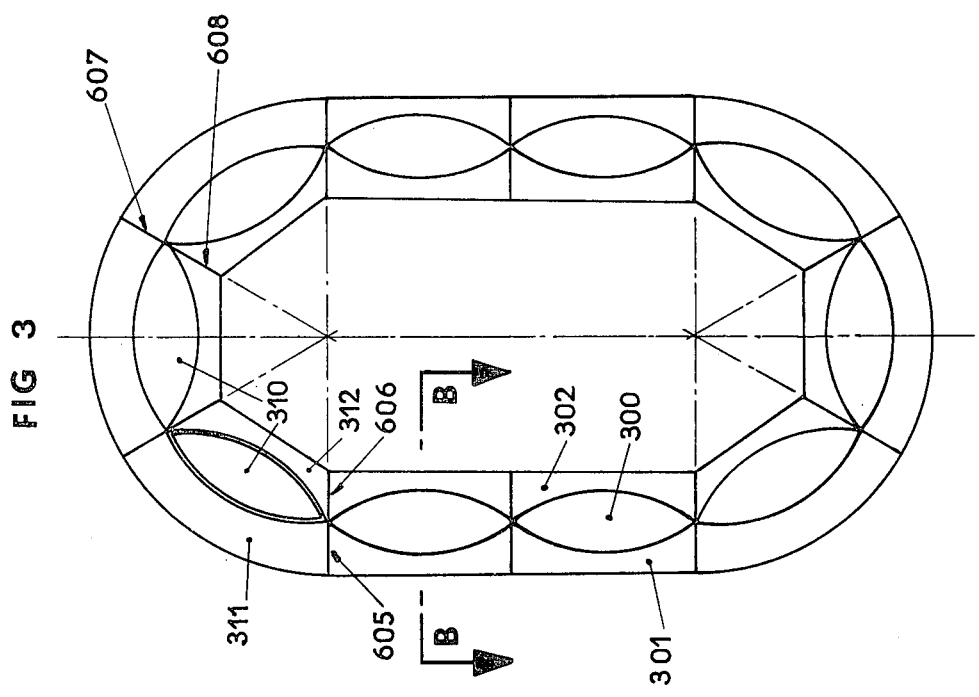

The joining edges of the walls 101 and 102 are fitted with brackets 630 at the ends of straps 631 lapped over the edge of the walls and forming focal points in the walls enclosing the pressurised cells to direct tensile strains into an intermediate junction member 632 through detachable pins 633 retained axially by a split-pin 634 and a washer 635.

Junction member 632 is composed of high-strength wires wound round pairs of journals 636, and covered with flexible moulded material giving to the whole the desired strength and elasticity.

Figure 4:
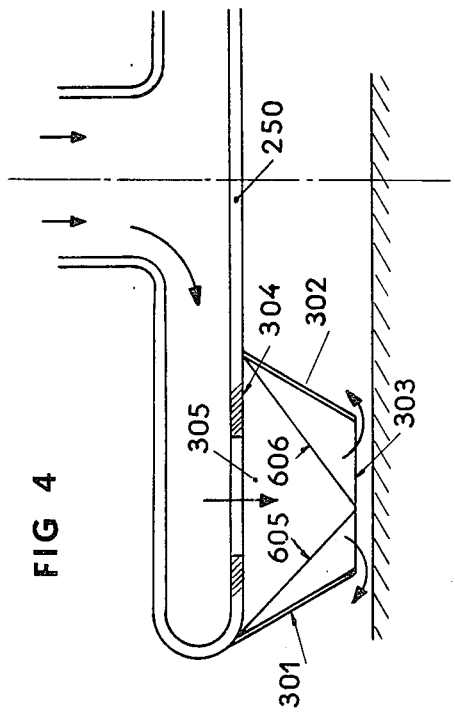
Figure 3A:
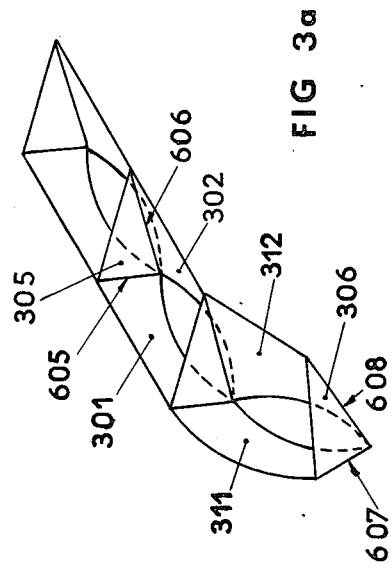

The same techniques may advantageously be used in the case of the layouts in FIGS. 1a, 3 and 4 except that the number of link pins will vary.

The whole of the arrangement thus described for feeding and enclosing the support cushion of ground-reaction machines defines compartments or cells in which the pressure is liable to vary as a function of trim, as a result of the variation in efflux section between the bottoms of the walls and the ground. These compartments thus form the point of impingement of vertical forces which give rise to maximum moments restorative of the equilibrium of the platform, since these forces exert the whole of their effect at its periphery, where they enjoy the maximum mechanical advantage. The central chamber enclosed by the peripheral arrangement always has an appreciably uniform pressure resulting from the practically non-existent outflow to any of the peripheral cells across the bottoms of the internal walls of the device. These walls are only brought into use in the case of an inclination of the platform relative to the ground plane which reduces sufficiently the corresponding efflux section. Thus, they constitute an auxiliary arrangement in case of local failure of the exterior wall and maintain the cushion enclosure in all circumstances.

The arrangements described are particularly well suited to be adapted to an automatic or manual stability-control system where the feed to consecutive cells is achieved either by separate air generators, or by subsidiary trunks from a common air generator.

In consequence, an arrangement according to the invention may be used in all cases where the support of ground-reaction vehicle necessitates at the same time the ability to cross major obstacles, a high platform stability and possibly automatic stabilisation, a low wave-drag and spray-drag when moving above the water. These applications embrace particularly: unguided terrestrial hovercraft, marine and amphibious hovercraft, special ground-reaction platforms for transport, materials handling, and ground-reaction impact absorption.

I claim:

1. A flexible enclosure for enclosing a fluid cushion to support a ground-effect machine having a platform, said enclosure comprising a plurality of separate cells, each of which forms a peripheral support plenum cushion, connected in series and adapted to be attached at an upper attachment section thereof along the periphery of said platform and surrounding a single undivided chamber, each of said cells being bounded by two converging, intersecting flexible walls connected to the flexible walls of adjoining cells, the horizontal cross-sectional area of each of said cells decreases continuously from the upper attachment section at the periphery of said platform where air under pressure is fed to said cells, to a lower section thereof through which the air exits, the flexible walls of each of said cells are of bi-convex lenticular shape in horizontal cross-section throughout their height.

2. A flexible enclosure as claimed in claim 1, wherein all the cells are identical and arranged regularly around the periphery of the enclosure such that the enclosure can be attached to a platform of circular shape.

3. A flexible enclosure claimed in claim 1 wherein the connection between the flexible walls of two adjoining cells is along the junction lines of the walls, and each wall of each of said cells is substantially straight in vertical cross-section, and extends downwardly from the upper attachment section to the lower section thereof, and toward the other wall.

4. A ground effect machine including a flexible enclosure as claimed in claim 1, wherein each of the cells is fed from a separate air generator whereby the flow and pressure characteristics in each of the cells and therefore the position of the center of thrust of the platform are both adjustable so that the machine can be adapted to a stability control means.

5. A ground effect machine including a flexible enclosure as claimed in claim 1, wherein each of the cells is fed from a subsidiary trunk connected to a common air generator whereby the flow and pressure characteristics in each of the cells and therefore the position of the center of thrust of the platform are both adjustable so that the machine can be adapted to a stability control means.

6. An air cushion vehicle having a platform with a base, a flexible skirt attached to and extending downwardly from the base of the platform to surround an air cushion between the platform and an underlying surface, said skirt comprising repeating pairs of laterally spaced intersecting flexible walls, each pair of walls defining a peripheral plenum support cushion cell therebetween and being connected to the adjacent pairs of walls in end to end relationship, each wall of said pairs of walls having an upper section thereof attached to the base of the platform and extending downwardly and toward the other wall of that pair the flexible walls of each of said cells are of bi-convex lenticular shape in horizontal cross-section throughout their height, the horizontal cross-sectional area of each of said cells decreases continuously from the upper end, into which air under pressure is fed to that cell, to the lower end thereof through which the air exits.

* * * * *